(12) United States Patent
Schenk

(10) Patent No.: US 6,466,631 B1
(45) Date of Patent: Oct. 15, 2002

(54) DEVICE AND METHOD OF CHANGING THE NOISE CHARACTERISTIC IN A RECEIVER OF A DATA TRANSMISSION SYSTEM

(75) Inventor: Heinrich Schenk, München (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/627,732

(22) Filed: Jul. 28, 2000

Related U.S. Application Data

(63) Continuation of application No. PCT/DE99/00045, filed on Jan. 13, 1999.

(30) Foreign Application Priority Data

Jan. 28, 1998 (DE) .......................................... 198 03 235

(51) Int. Cl.$^7$ ............................. H04L 25/08; H04B 1/10
(52) U.S. Cl. ........................ 375/346; 375/232; 381/94.1
(58) Field of Search .................................. 375/232, 254, 375/285, 346, 348, 233; 381/94.1, 94.4; 704/226

(56) References Cited

U.S. PATENT DOCUMENTS

| | | | | | |
|---|---|---|---|---|---|
| 4,255,763 A | * | 3/1981 | Maxemchuk et al. | .. | 375/240.12 |
| 4,631,735 A | * | 12/1986 | Qureshi | ...................... | 375/254 |
| 4,713,829 A | * | 12/1987 | Eyuboglu | .................... | 375/259 |
| 4,833,693 A | * | 5/1989 | Eyuboglu | .................... | 375/254 |
| 5,295,225 A | * | 3/1994 | Kane et al. | .................. | 704/226 |
| 5,485,522 A | * | 1/1996 | Sölve et al. | ................... | 381/56 |
| 5,517,527 A | * | 5/1996 | Yu | .............................. | 375/233 |
| 5,604,769 A | * | 2/1997 | Wang | .......................... | 375/229 |
| 5,621,760 A | * | 4/1997 | Gotoh et al. | ................ | 375/245 |
| 5,696,821 A | * | 12/1997 | Urbanski | ............... | 379/406.07 |
| 5,742,694 A | * | 4/1998 | Eatwell | ..................... | 381/94.2 |
| 5,777,692 A | * | 7/1998 | Ghosh | ........................ | 348/725 |
| 5,784,415 A | * | 7/1998 | Chevillat et al. | ........... | 375/341 |
| 6,002,713 A | * | 12/1999 | Goldstein et al. | ........... | 375/222 |

FOREIGN PATENT DOCUMENTS

EP 0707401 A * 4/1996

* cited by examiner

*Primary Examiner*—Young T. Tse
(74) *Attorney, Agent, or Firm*—Laurence A. Greenberg; Werner H. Stemer; Gregory L. Mayback

(57) ABSTRACT

A device for changing a noise characteristic in a receiver of a data transmission system that contains a noise predictor that is connected to a noise attenuator. In this configuration, the dimensioning of the noise attenuator is fixed whereas coefficients of the noise predictor can be adaptively adjusted to the respective interference.

6 Claims, 3 Drawing Sheets

DEVICE AND METHOD OF CHANGING THE NOISE CHARACTERISTIC IN A RECEIVER OF A DATA TRANSMISSION SYSTEM

CROSS-REFERENCE TO RELATED APPLICATION

This is a continuation of copending International Application PCT/DE99/00045, filed Jan. 13, 1999, which designated the United States.

BACKGROUND OF THE INVENTION

1. Field of the Invention

The present invention relates both to a device and to a method for changing the noise characteristic in a receiver of a data transmission system.

Devices and methods for improving the noise characteristic in receivers are known which use either a noise predictor or a noise attenuator. With the same number of coefficients, a better signal/noise ratio can be obtained with the noise attenuator than with the noise predictor. Because of the feedback structure, the coefficients have to be continuously monitored with respect to stability. This is very complex and also does not always lead to the desired success.

From Published, European Patent Application EP 0 707 401 A2, a device is known which exhibits a noise predictor.

SUMMARY OF THE INVENTION

It is accordingly an object of the invention to provide a device and a method for changing the noise characteristics in a receiver that overcome the above-mentioned disadvantages of the prior art devices and methods of this general type, which provides for a greater or better signal/noise ratio, respectively, and is technically simple to implement.

With the foregoing and other objects in view there is provided, in a data transmission system having a receiver, a device for changing a noise characteristic in the receiver. The device includes a noise predictor having coefficients that can be adaptively adjusted to a respective interference; and a noise attenuator connected to the noise predictor and has fixed dimensions.

According to the invention, the object is achieved by the device for changing the noise characteristic in the receiver of a data transmission system. The device contains the noise predictor that is connected to the noise attenuator, wherein the dimensioning of the noise attenuator is fixed and coefficients of the noise predictor can be adaptively adjusted to the respective interference.

With the foregoing and other objects in view there is further provided, in accordance with the invention, a method for changing noise characteristics in a receiver. The method includes the steps of providing a data transmission system having the receiver, a noise predictor, and a noise attenuator; fixing a dimensioning of the noise attenuator; and adaptively adjusting coefficients of the noise predictor to a respective interference.

According to a preferred embodiment of the invention, the fixed noise attenuator is a first-order system having the following transfer function $$NA(z) = \frac{a_1 + a_2 \cdot z^{-1}}{1 + b_2 \cdot z^{-1}},$$

where $a_i$ and $b_i$ are the coefficients of the noise attenuator. For reasons of stability, $|b_2| \leq 1$ initially. In contrast, z describes the complex z domain operator (z transformation). By definition, the following holds true:

$$Z = e^{j2\pi f/fa},$$

where fa is the sampling frequency of the time-discrete system.

According to another preferred embodiment, the adaptive noise predictor is a first-order system having the following transfer function:

$$NP(z) = c_1 + c_2 \cdot z^{-1}.$$

The noise attenuator is preferably connected with feedback in order to achieve the required signal/noise ratios.

Although a multiplicity of fixed coefficients is possible for the noise attenuator, the following have been found to be particularly advantageous at least in approximation:

$a_1 = -\frac{7}{8}$; $a_2 = 0$; $b_2 = 0$ or $a_1 = -2$; $a_2 = \frac{9}{16}$; $b_2 = \frac{1}{2}$.

Other features which are considered as characteristic for the invention are set forth in the appended claims.

Although the invention is illustrated and described herein as embodied in a device and a method for changing the noise characteristic in a receiver of a data transmission system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
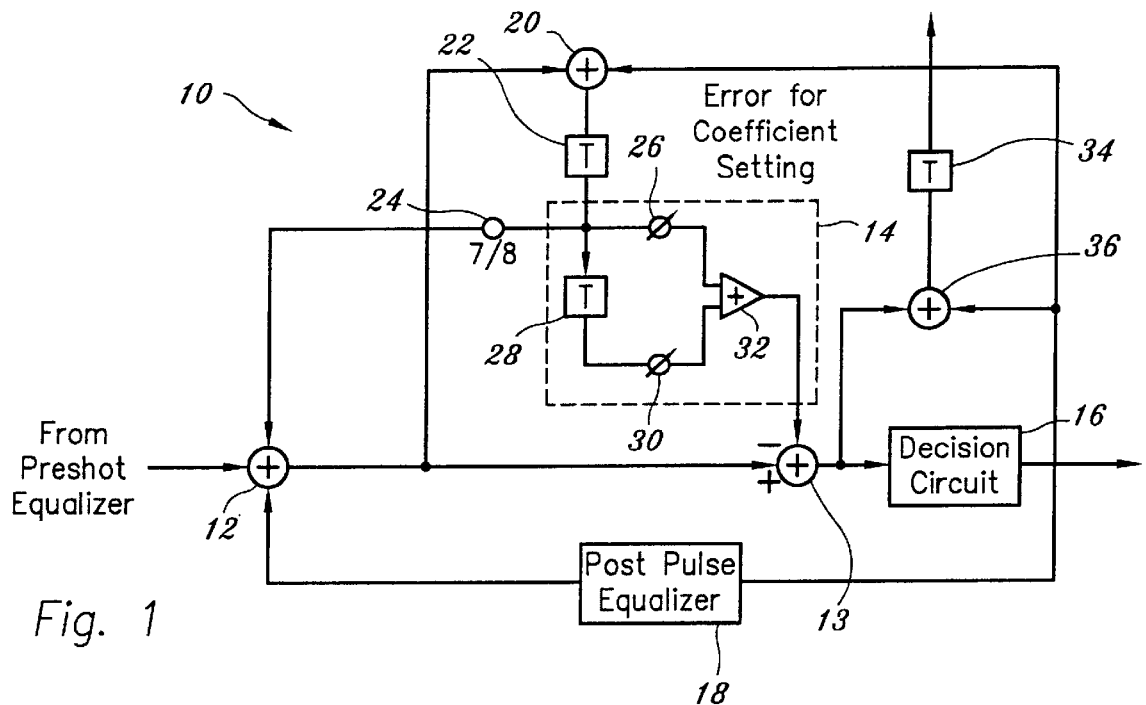
FIG. 1 is a block circuit diagram of a device according to a first embodiment of the invention.
Figure 2:
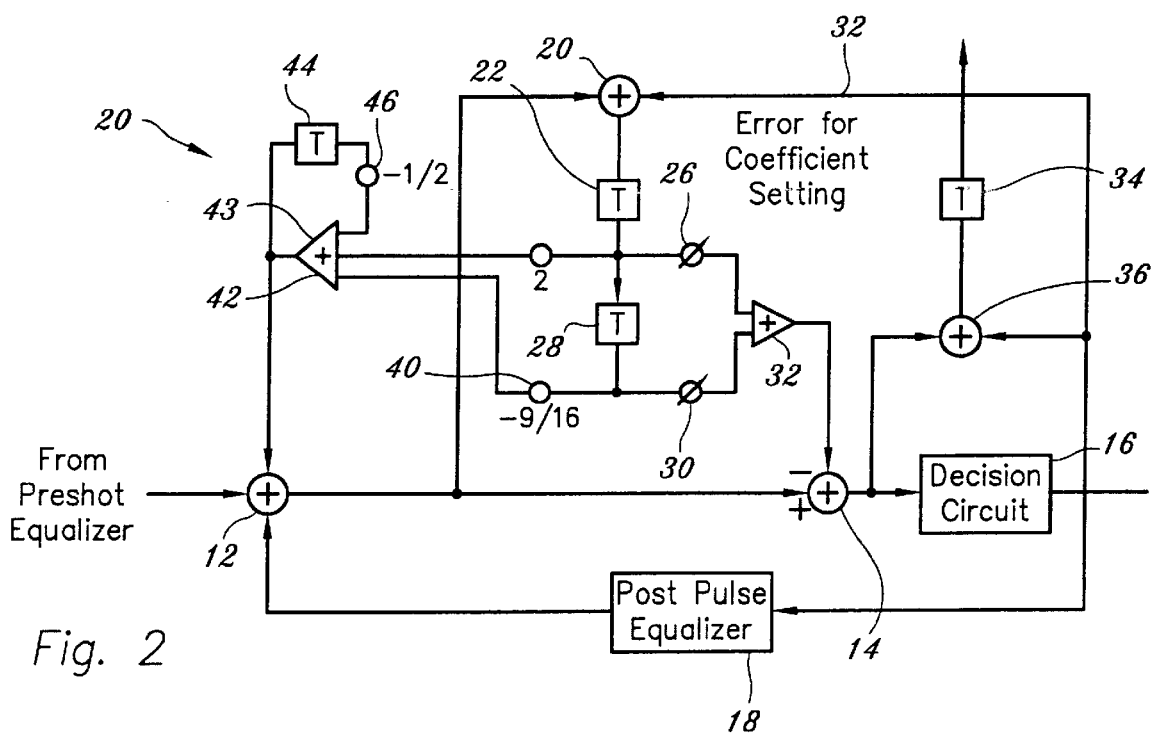
FIG. 2 is a block circuit diagram of the device according to a second embodiment.

To achieve better understanding, a general introduction is first given with respect to previously used noise predictors by or noise attenuators which are used for a device 10 according to the invention (FIG. 1) or, respectively, 20 (FIG. 2).

The noise characteristic of a data transmission system can be improved by using a noise predictor. In this method, an estimated value of the noise value currently received is calculated from previously received noise values at a decision circuit input. However, this is only possible if the noise values at the decision circuit input are correlated with one another.

White noise is characterized by the fact that there are no statistical links between the individual noise values. The result is that a noise predictor can only be used in a meaningful way if there is no white noise present.

Figure 3:
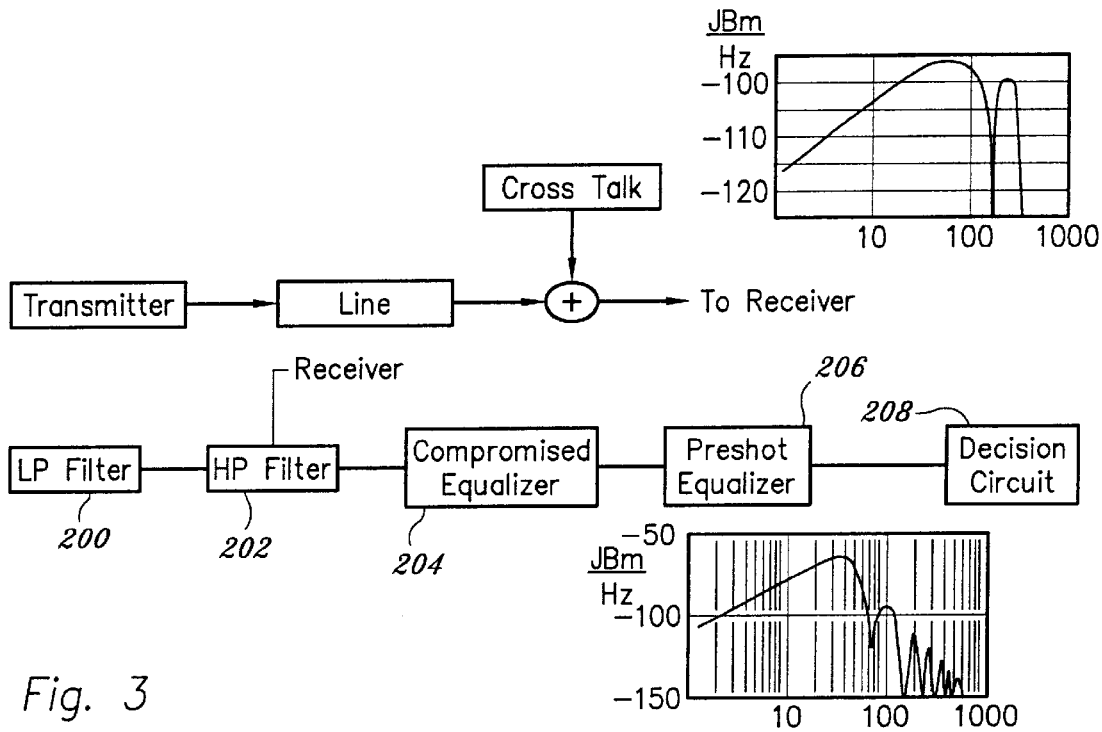
FIG. 3 is a block diagram of a basic configuration of a data transmission system and spectral power density of noise at a receiver input and at an input of a decision circuit, wherein interference occurs due to crosstalk.

Integrated chips, for example, are considered, which are used in copper line data transmission systems, e.g. for implementing the U interface in integrated services digital network (ISDN) facilities. Twin copper wire exhibits an attenuation characteristic which rises with frequency. This must be equalized again, at least partially, with the aid of the linear equalizer in the receiver that also increases the power spectral density of the noise with increasing frequency. The crosstalk attenuation of a cable decreases with increasing frequency so that the spectrum of the interference caused by crosstalk has a corresponding spectral shape. Other types of interference and especially injections of narrow-band signals have spectrally shaped noise spectra. It can, therefore, be assumed that at the decision circuit input in the receiver, it is not white noise but only narrow band noise that is present. This is illustrated in FIG. 3.

Assuming an interference caused by near-end crosstalk at the receiver input. The power spectral density of the interference is shown in FIG. 3 in accordance with the model specified in ANSI Specification T1.601. The interference passes through linear filter blocks including a low-pass filter 200, a high-pass filters 202, a compromised equalizer 204 and a preshoot equalizer 206 of the receiver. The post-pulse ringing distortions are compensated with the aid of a post-pulse ringing equalizer (decision feedback equalizer) which, however, does not influence the power spectral density of the noise. It is, therefore not contained in FIG. 3. The power density spectrum of the noise at a decision circuit input is also shown in FIG. 3. The basis for this is the preshoot equalizer for a 5.5 km AWG 26 line.

Because of the high frequency dependence of the noise of the input of a decision circuit 208 which follows the preshoot equalizer 206, a considerable improvement of the noise Characteristic can be expected here if a noise predictor is interposed.

Figure 4:
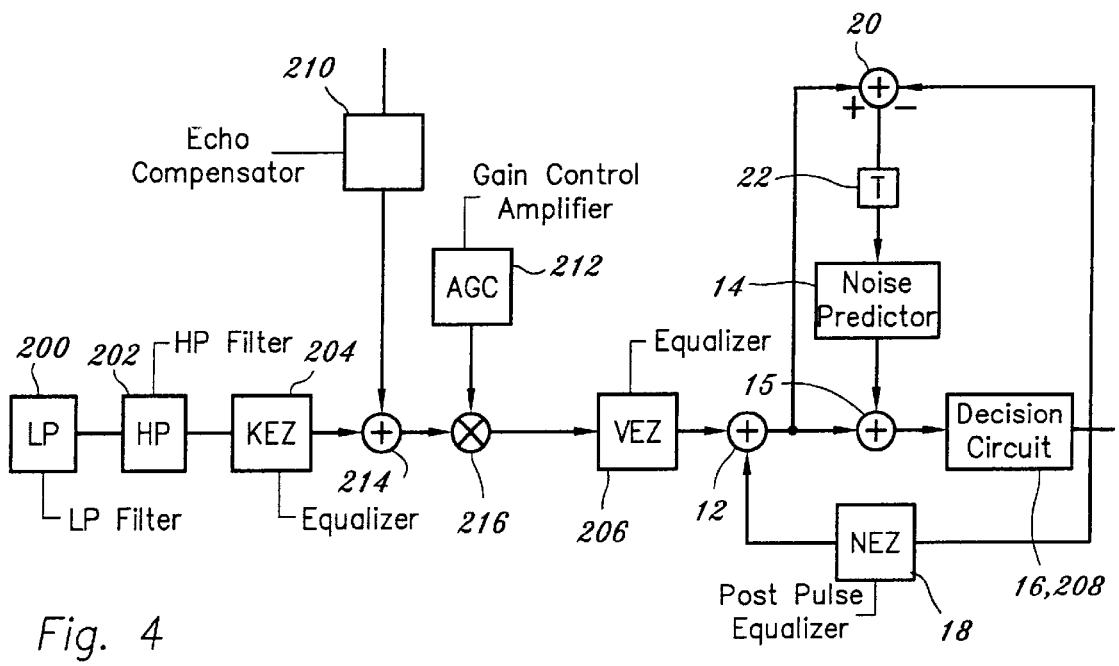
FIG. 4 is a block circuit diagram of the receiver including a noise predictor.

Neglecting decision errors, the noise values received and present at the decision circuit input can be obtained by forming the difference from the equalized signal and the decided values. FIG. 4 shows the block diagram of the receiver with noise predictor. In this configuration, the noise injected at a receiver input is spectrally deformed by the low-pass filter 200, the high-pass filter 202, the compromise equalizer 204 and the preshoot equalizer 206 subsystems. An echo compensator 210 is used for canceling the echoes caused by a transmitter, and a gain-controlled amplifier AGC 212 ensures a constant dynamic range of the signal, which is independent of line length, at the input of the following subsystems. To this end, an output signal of the echo compensator 210 is added to an output of the compromise equalizer 204 in an adding stage 214 and the signal is multiplied by a AGC signal in a multiplication stage 216. The signal then passes to the preshoot equalizer 206.

According to the invention, an output signal of the preshoot En equalizer 206 is supplied to the circuit configuration already presented in FIG. 1 or 2. Therefore, the output signal of the preshoot equalizer 206 passes to an adding stage 12 which is also supplied with an output signal of an post-pulse ringing equalizer 18. An output signal of the adding stage 12 is supplied to two further adding stages 15 and 20. An output signal of the adding stage 15 passes to the decision circuit 16 or 208, respectively. At the output of the decision circuit 16 or 208, respectively, the signal, with the noise removed or reduced, can be picked up. This signal is supplied both to an input of the post-pulse ringing equalizer 18 and to a subtraction input of the adding stage 20. Therefore, the output signal of the decision circuit 16 or 208, respectively, is subtracted from the output signal of the adding stage 12. This signal is supplied via a delay stage 22 to the noise predictor 14, the output of which is supplied to the adding stage 15. Neglecting the inherent interference, the two blocks do not influence the spectral shaping of the noise signal. The distortions caused by the pulse response values after the main value (post-pulse ringing) are compensated with the aid of the post-pulse ringing equalizer 18. This, too, does not influence the noise spectrum of the noise signal present at the decision circuit 16; 208 if the behavior in the case of wrong decisions is not taken into consideration.

Figure 5:
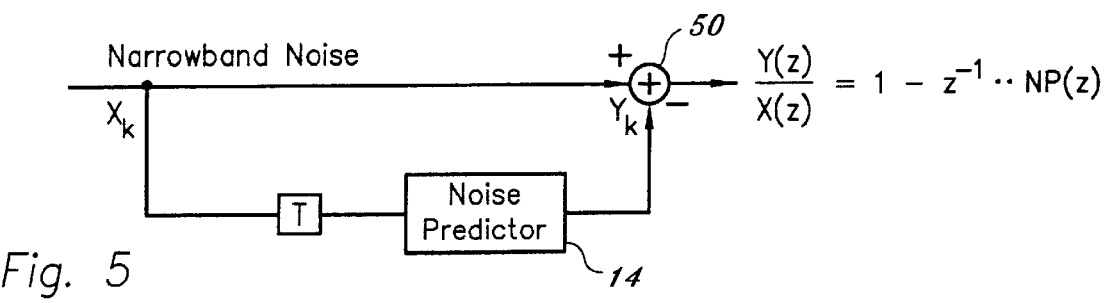
FIG. 5 is a block diagram of a basic configuration of a noise predictor.

Considering then that the noise predictor 14 is normally used. The basic model configuration is shown in FIG. 5. The arrangement is not configured recursively and has an adding stage 50. The adding stage 50 is supplied with the signal $x_k$. The signal $x_k$ is also supplied via a delay block T to the noise predictor 14. The output of the latter is supplied to kg the adding stage 50 in order to subtract the output signal of the noise predictor 14 from the signal $x_k$. At the output, the signal $y_k$ is then present.

In the delay block T, the processing time needed for the decision circuit is taken into consideration. A non-recursive system having the following transfer function $$NP(z) = \sum_{i=1}^{M} a_1 \cdot z^{-i+1}$$

is used for the noise predictor 14. The coefficients $a_i$ must be selected in such a manner that the noise power of the residual noise (the signal $y_k$ in FIG. 5) becomes minimum. The adjustment can be done, for example, iteratively with the aid of the mean square error (MSE) algorithm. The adjustment rule for the coefficients is $$a_i(k+1) = a_i(k) + g \cdot x_{k-b+1} \cdot y_k$$

The correcting variable g influences the dynamic behavior of the noise predictor 14. In conjunction with the dynamic range of the signals x and y, the settling time is defined by the choice of g. With the constant g, therefore, the settling time is a function of the dynamic range of the signals x and y or, respectively, of the power of the noise. A settling characteristic which is independent of the noise power is obtained if, instead of the variables $x_k$ or $y_k$, respectively, only their sign is used (sign-sign algorithm).

The coefficients for minimizing the noise power of the signal $y_k$ can also be calculated in a closed form if the auto correlation function of the noise signal $x_k$ or of its power density spectrum is known. This results in the same values as in the above-mentioned iterative adjustment of the coefficients. Having the optimum coefficients, the power of the resultant residual noise ($y_k$) can be determined.

The reductions in noise power that can be achieved for the transmission system shown in FIG. 3 are assembled in Table 1 for various predictor lengths M. A predictor length in this case is the number of coefficients of the (non-recursive) noise predictor.

Due to the high frequency dependence of the NEXT noise, this noise is amplified by more than 2 dB more than white noise by the linear receiver subsystems. Due to the noise predictor 14 on the other hand, the noise gain is higher by more than 2 dB because of the narrowband characteristic of the NEXT noise so that in this example, approximately the same noise power is always obtained after the noise predictor 14 when a noise predictor is used.

| Noise at the receiver input | Noise power at the decision circuit input without noise predictor | Noise power at the decision circuit input with noise predictor | Reduction in noise power |
|---|---|---|---|
| NEXT to ANSI T1.601 | 20.0 dB | M = 2   24.3 dB | 4.3 dB |
| | | M = 3   24.8 dB | 4.8 dB |
| | | M = 4   25.2 dB | 5.2 dB |
| White noise power 0...320 kHz as for NEXT | 22.1 dB | M = 2   24.3 dB | 2.2 dB |
| | | M = 3   24.5 dB | 2.4 dB |
| | | M = 4   24.6 dB | 2.5 dB |

Table 1: Noise power at the decision circuit input with and without noise predictor for various predictor lengths, 5.5 km AWG 26 line.

Figure 6:
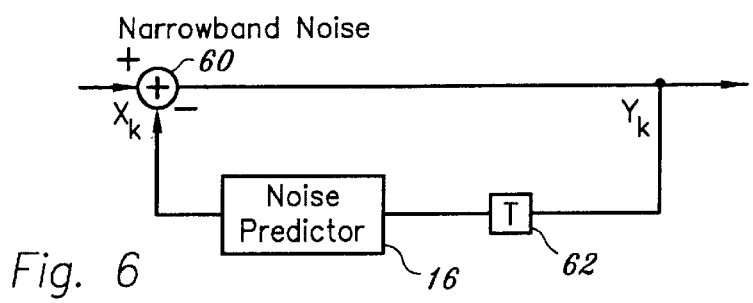
FIG. 6 is a block diagram of a basic configuration of a noise attenuator.

The noise power acting at the decision circuit can also be reduced by an altered configuration. In this configuration, past noise values acting at the decision circuit are weighted via a filter network and subtracted from the current noise value present. The basic configuration, which is called a noise attenuator 16, is shown in FIG. 6. The configuration has an adding stage 60 which is supplied with the signal $x_k$. The adding stage 60 subtracts from this a signal which corresponds to the output signal $y_k$ which is conducted through a delay block 62 followed by the noise attenuator 16.

If a non-recursive filter is used for the noise attenuator, having the transfer function $$NP(z) = \sum_{i=1}^{M} a_i \cdot z^{-i+1}$$

the coefficients can also be set iteratively with the aid of the LMS or the sign-sign algorithm. The feedback structure of the configuration can result in an unstable system behavior so that it is necessary to monitor the coefficients.

Figure 7:
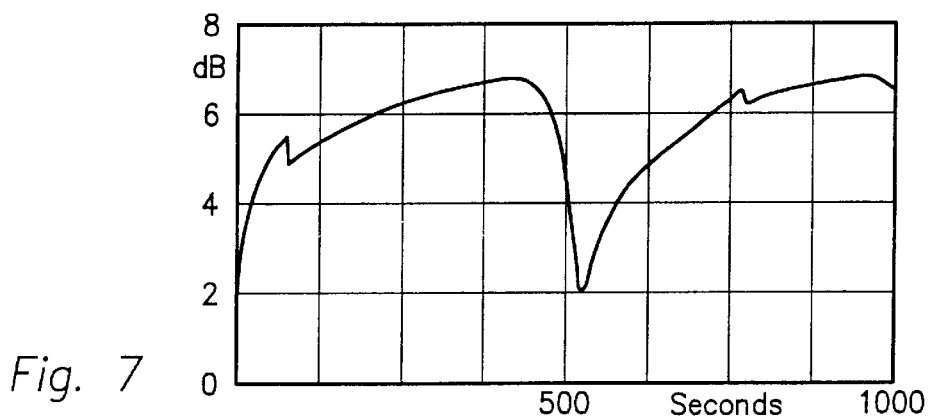
FIG. 7 is a graph with respect to an achievable noise reduction when using the noise attenuator with two coefficients with NEXT noise of a 5.5 km ABG 26 line.

However, the noise suppression that can be achieved can be greater than in the case of the noise predictor 14. This is illustrated in FIG. 7. It shows the noise reduction for the transmission system shown in FIG. 3 when the noise attenuator 16 with two coefficients (M=2) is used.

In this case, the coefficients were not monitored with respect to stability, but the correcting variable for the coefficient adjustment according to the MSE algorithm was selected to be I very small. It can be clearly seen that the behavior tends toward instability without coefficient monitoring. The maximum achievable noise suppression is between 6 and 7 dB in this case, in contrast to 4.3 dB when the noise predictor 14 is used.

The previous results have shown that, although it is possible to achieve greater noise reduction with the noise attenuator 16, with a given filter length, than with the noise predictor 14, it is not very suitable for use in a transmission system with changing channel and interference characteristics because of the poor stability characteristics.

Figure 8:
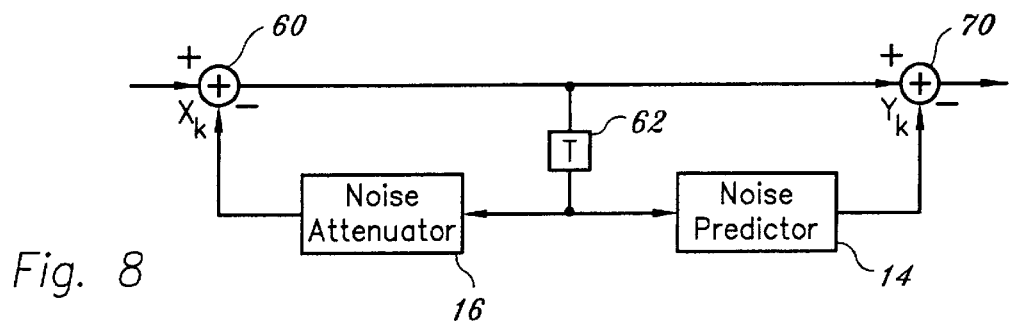
FIG. 8 is a block circuit diagram of a combined noise attenuator/noise predictor configuration.

A system is, therefore, being considered which consists of both the noise attenuator 16 and the noise predictor 14. The noise attenuator 16 is permanently set so that no unstable behavior can result. The noise predictor 14 can be adjusted iteratively in the usual way. The resultant configuration is shown in FIG. 8. The configuration initially corresponds to the configuration of FIG. 6, i.e. the adding stage 60, the delay block 62 and the noise attenuator 16 are provided. However, the configuration is supplemented by a further adding stage 70 and the noise predictor 14 (FIG. 8). The adding stage 70 and the noise predictor 14 are interconnected in such a manner that the output signal of the adding stage 60 is supplied as input signal to the adding stage 70. The output It of the delay block 62 is also conducted to the input of the noise predictor 14. The output of the noise predictor 14 is subtracted from the output signal of the adding stage 60 in the adding stage 70. The output signal of the adding stage 70 is the output signal $y_k$.

For the noise attenuator 16, a recursive digital filter with fixed coefficients can also be selected in this case. After the coefficients have been determined, the optimum coefficients of the adaptive noise predictor 14 can be calculated in a closed form that makes it possible to determine the maximum achievable noise reduction.

In the text that follows, a first-order fixed noise attenuator 16 having the transfer function $$NA(z) = \frac{a_1 + a_2 \cdot z^{-1}}{1 + b_2 \cdot z^{-1}},$$

is selected. To avoid "genuine" multiplications and thus to reduce the implementation expenditure, the coefficients can be selected in such a manner that they can be represented by very few shift and addition or subtraction operations. A first-order system having the transfer function $$NP(z) = c_1 + c_2 \cdot z^{-1}$$

is used as the adaptive noise predictor 14.

$$NA(z) = \frac{a_1 + a_2 \cdot z^{-1}}{1 + b_2 \cdot z^{-1}},$$

The maximum achievable noise reductions for variously dimensioned noise attenuators are compared in Table 2 for the 7[] NEXT noise hitherto used in the examples or, respectively, a white noise of equivalent power and an AWG 26 line of 5.5 km length.

It is found that the pole points of the feedback-type noise attenuator system which determine the stability of the transmission system influence the achievable noise reduction. It must be the aim to achieve the highest possible noise reduction with the smallest possible amount of pole points, i.e. with the greatest possible distance from the stability edge |z|=1. The amounts of the pole points of the feedback-type noise attenuator are also specified in Table 2.

| Noise attenuator | | | Pole point of the feedback-type system | NEXT | Gain due to NA | White noise | Gain due to NA | Comments |
|---|---|---|---|---|---|---|---|---|
| 0 | 0 | 0 | 0 | 4.25 dB | 0 | 2.19 dB | 0 | Without NA |
| −5/4 | 3/8 | 0 | 0.75/0.50 | 6.04 dB | 1.79 dB | 2.81 dB | 0.62 dB | Nrec. NA |
| −7/8 | 0 | 0 | 0.875/0.0 | 6.11 dB | 1.86 dB | 2.97 dB | 0.78 dB | Nrec. NA |
| −2 | 9/16 | 1/2 | 0.75/0.75 | 6.36 dB | 2.11 dB | 2.92 dB | 0.73 dB | rec. NA |
| −7/4 | 5/16 | 1/2 | 0 0.9045/0.3455 | 6.41 dB | 2.16 dB | 3.01 dB | 0.82 dB | rec. NA |

Table 2: Maximum noise power gain when using the fixed noise attenuator 16 in conjunction with the adaptive noise predictor 14 with two coefficients in the case of NEXT and in the case of white noise, 5.5 km AWG 26 line (Nrec.=nonrecursive, rec.=recursive, NA=noise attenuator).

As can be seen from Table 2, using the fixed noise attenuator 16 can improve the noise characteristic in the case of NEXT by another 2 dB and in the case of white noise by about 0.75 in comparison with a system containing a pure noise predictor with two coefficients. Taking into consideration the achievable noise suppression, implementation expenditure and stability characteristic (distance from the stability edge of the feedback-type system), the fixed noise attenuator 16 having the following coefficients $a_1 = -7/8$; $a_2 = 0$; $b_2 = 0$ or $a_1 = -2$; $a_2 = 9/16$; $b_2 = 1/2$ can be used.

FIG. 1 shows the block diagram of the adaptive noise predictor 14 including the fixed noise attenuator 16 according to a first embodiment inside the receiver. In comparison with the conventional noise predictor, the only thing required is weighting of the error with 7/8 (which can be achieved by 1 1/8) and an additional addition.

In detail, the circuit configuration of FIG. 1 is configured as follows. The signal from the preshoot equalizer 206 passes to the adding stage 12 that has two other inputs. The output of the adding stage 12 is supplied to two further adding stages 13 and 20. An output of the adding stage 13 is supplied to the input of the decision circuit 16. At the output of the decision circuit 16, the output signal of the configuration can be picked up. The output signal at the decision circuit 16 is fed back to the adding stage 12 via the post-pulse ringing equalizer 18. The output signal of the decision circuit 16 is also supplied to the adding stage 20. The output of the adding stage 20 is supplied to a weighting stage 24 with a factor of 7/8 via a delay block 22. The output of the weighting stage 24 is supplied to the adding stage 12. The junction between the delay block 22 and the weighting stage 24 is supplied to a variable weighting block 26, the output signal of which is applied to a comparator 32. The junction between the delay block 22 and the weighting stage 24 is also supplied to another input of the comparator 32 via a further delay block 28 followed by a variable weighting stage 30. The output of the comparator 32 is supplied to the adding stage 13 in such a manner that its signal is subtracted from the output signal of the adding stage 12. The circuit components 26, 28, 30 and 32 form the noise predictor 14.

The configuration of FIG. 1 is extended by a further adding stage 36 followed by a delay block 34 for weighting an error for the adjustment of coefficients. For this purpose, the adding stage 36 is supplied with the output signal of the decision circuit 16 and its input signal. The error can be picked up at an output of the delay block 34.

FIG. 2 shows the block diagram for a second embodiment. A noise suppression that is better by about 0.25 dB is possible with the somewhat increased implementation expenditure, injecting a NEXT according to Table 2.

The circuit configuration of FIG. 2 largely corresponds to that of FIG. 1 but is extended in the following manner. A further comparator 43 is provided. The comparator 43 has three inputs. A first input is connected to the output of the delay block 28 via a weighting stage 40. The weighting stage 40 contains a weighting factor of −9/16. A second input of the comparator 43 is connected to the output of the delay block 22 via the weighting stage 24 already explained. However, the weighting factor is now 2. A third input of the comparator 43 is connected to the output of the comparator 43 via a further weighting stage 46 preceded by a delay block 44. The weighting factor in the weighting stage 46 is −1/2. In addition, the output of the comparator 43 is connected to an input of the adding stage 12.

I claim:

1. In a data transmission system having a receiver, a device for changing a noise characteristic in the receiver, the device comprising:

a noise predictor having coefficients that can be adaptively adjusted to a respective interference; and a noise attenuator connected to said noise predictor and having fixed dimensions, and a signal, which results from a subtraction of a noise signal and an input signal from said noise attenuator, being fed to said noise predictor and said noise attenuator.

2. The device according to claim 1, wherein said noise attenuator is a first-order system having a transfer function defined by:

$$NA(z) = \frac{a_1 + a_2 \cdot z^{-1}}{1 + b_2 \cdot z^{-1}},$$

where $a_i$ and $b_i$ are coefficients of said noise attenuator, and z describes a complex z domain operator (z transformation).

3. The device according to claim 1, wherein said noise attenuator has fixed coefficients defined as:

$a_1 = -7/8$; $a_2 = 0$; $b_2 = 0$ or $a_1 = -2$; $a_2 = 9/16$; $b_2 = 1/2$.

4. A method for changing noise characteristics in a receiver, which comprises the steps of:

providing a data transmission system having the receiver, a noise predictor, and a noise attenuator;

fixing a dimensioning of the noise attenuator;

feeding a signal, which results from a subtraction of a noise signal and an input signal from the noise attenuator, to the noise predictor and the noise attenuator; and adaptively adjusting coefficients of the noise predictor to a respective interference.

5. The method according to claim 4, which comprises providing the noise attenuator as a first-order system having a transfer function defined by:

$$NA(z) = \frac{a_1 + a_2 \cdot z^{-1}}{1 + b_2 \cdot z^{-1}},$$

where $a_i$ and $b_i$ are coefficients of the noise attenuator, and z describes a complex z domain operator (z transformation).

6. The method according to claim 4, which comprises providing the noise attenuator with fixed coefficients defined by:

$a_2=-7/8$; $a_2=0$; $b_2=0$ or $a_1=-2$; $a_2=9/16$; $b_2=1/2$.

* * * * *